United States Patent
Qiu et al.

(10) Patent No.: US 11,624,442 B2
(45) Date of Patent: Apr. 11, 2023

(54) PUSH-DOWN-TO-OPEN HIGH RECOVERY CHOKE VALVES

(71) Applicant: FISHER CONTROLS INTERNATIONAL LLC, Marshalltown, IA (US)

(72) Inventors: Yan Qiu, Marshalltown, IA (US); Luke Allen Novak, Ames, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 17/176,053

(22) Filed: Feb. 15, 2021

(65) Prior Publication Data

US 2022/0260160 A1    Aug. 18, 2022

(51) Int. Cl.
  *F16K 1/12* (2006.01)
  *F16K 1/38* (2006.01)
  *F16K 1/42* (2006.01)

(52) U.S. Cl.
  CPC .............. *F16K 1/12* (2013.01); *F16K 1/38* (2013.01); *F16K 1/42* (2013.01)

(58) Field of Classification Search
  CPC .............. F16K 1/12; F16K 1/38; F16K 1/42
  USPC .................... 251/122, 123, 124, 333, 360
  See application file for complete search history.

(56) References Cited

U.S. PATENT DOCUMENTS

| | | | | |
|---|---|---|---|---|
| 2,061,852 A * | 11/1936 | Schweitzer | ............ | F16K 1/54 |
| | | | | 73/861.58 |
| 2,114,921 A * | 4/1938 | Ernst | ............ | F16K 27/02 |
| | | | | 137/542 |
| 2,357,965 A * | 9/1944 | Mattimore | ............ | F16K 1/12 |
| | | | | 137/625.33 |
| 4,707,278 A * | 11/1987 | Breyer | ............ | F16J 15/3204 |
| | | | | 251/122 |
| 5,368,273 A * | 11/1994 | Dante | ............ | F02C 7/232 |
| | | | | 251/122 |
| 7,753,066 B2 * | 7/2010 | Passos | ............ | F23N 1/002 |
| | | | | 137/10 |
| 8,038,121 B2 * | 10/2011 | Gessaman | ............ | F16K 39/022 |
| | | | | 251/122 |
| 9,279,502 B2 * | 3/2016 | Dray | ............ | F16K 1/12 |
| 9,915,353 B2 * | 3/2018 | Westwater | ............ | F16K 1/42 |
| 10,094,488 B2 * | 10/2018 | Jackson | ............ | F16K 47/04 |

(Continued)

OTHER PUBLICATIONS

Annular definition printed Mar. 17, 2022.*
Flange definition printed Mar. 17, 2022.*

*Primary Examiner* — Robert K Arundale
(74) *Attorney, Agent, or Firm* — Marshall, Gerstein & Borun LLP (57) ABSTRACT

A valve trim assembly configured to be disposed in a fluid flow control valve, including, a valve seat adapted to be disposed in a fluid passageway of the fluid flow control valve. The valve seat includes an annular flange and a seating surface spaced from the annular flange. The valve trim assembly additionally includes a fluid control member movable relative to the valve seat to control fluid flow through the fluid passageway, wherein the fluid control member is movable from a closed position, in which the fluid control member sealingly engages the seating surface of the valve seat, and an open position, in which the fluid control member is spaced from the seating surface, by moving the fluid control member away from the annular flange of the valve seat.

21 Claims, 5 Drawing Sheets

(56) References Cited

U.S. PATENT DOCUMENTS

| | | | |
|---|---|---|---|
| 10,544,879 B2* | 1/2020 | Denton | F16K 47/08 |
| 10,655,745 B2* | 5/2020 | Qiu | F16K 1/54 |
| 2003/0062495 A1* | 4/2003 | Long | F16K 1/42 |
| | | | 251/122 |
| 2005/0104022 A1* | 5/2005 | Baca | F16K 1/54 |
| | | | 251/122 |
| 2005/0199840 A1* | 9/2005 | Brinks | F16K 47/00 |
| | | | 251/124 |
| 2017/0350513 A1* | 12/2017 | Shen | F16K 3/22 |

* cited by examiner

PUSH-DOWN-TO-OPEN HIGH RECOVERY CHOKE VALVES

FIELD OF THE DISCLOSURE

The present disclosure generally relates to fluid flow control devices and, more particularly, to a push-down-to-open high recovery choke valve that improves both choking performance and volumetric flow of fluid flowing therethrough.

BACKGROUND

Process control systems typically include various components for controlling various process parameters. For example, a fluid process control system may include a plurality of control valves for controlling flow rate, temperature, and/or pressure of a fluid flowing through the system. The end product is dependent on the accuracy of the control of these parameters, which is, in turn, dependent on the geometry and characteristics of the control valves. Control valves are, for example, specifically designed and selected to provide for particular flow capacities and pressure changes. When these characteristics are compromised, the quality of the end product may be affected.

In some applications (e.g., combustion turbine applications), it may be necessary to provide a control valve that is operable in a choked flow condition. Choked flow occurs when the velocity of fluid flowing through the control valve reaches sonic or supersonic speed (e.g., about Mach number 1 or Mach number 2.19 for fuel flowing through the control valve for gas turbine electricity generation applications).

Figure 1:
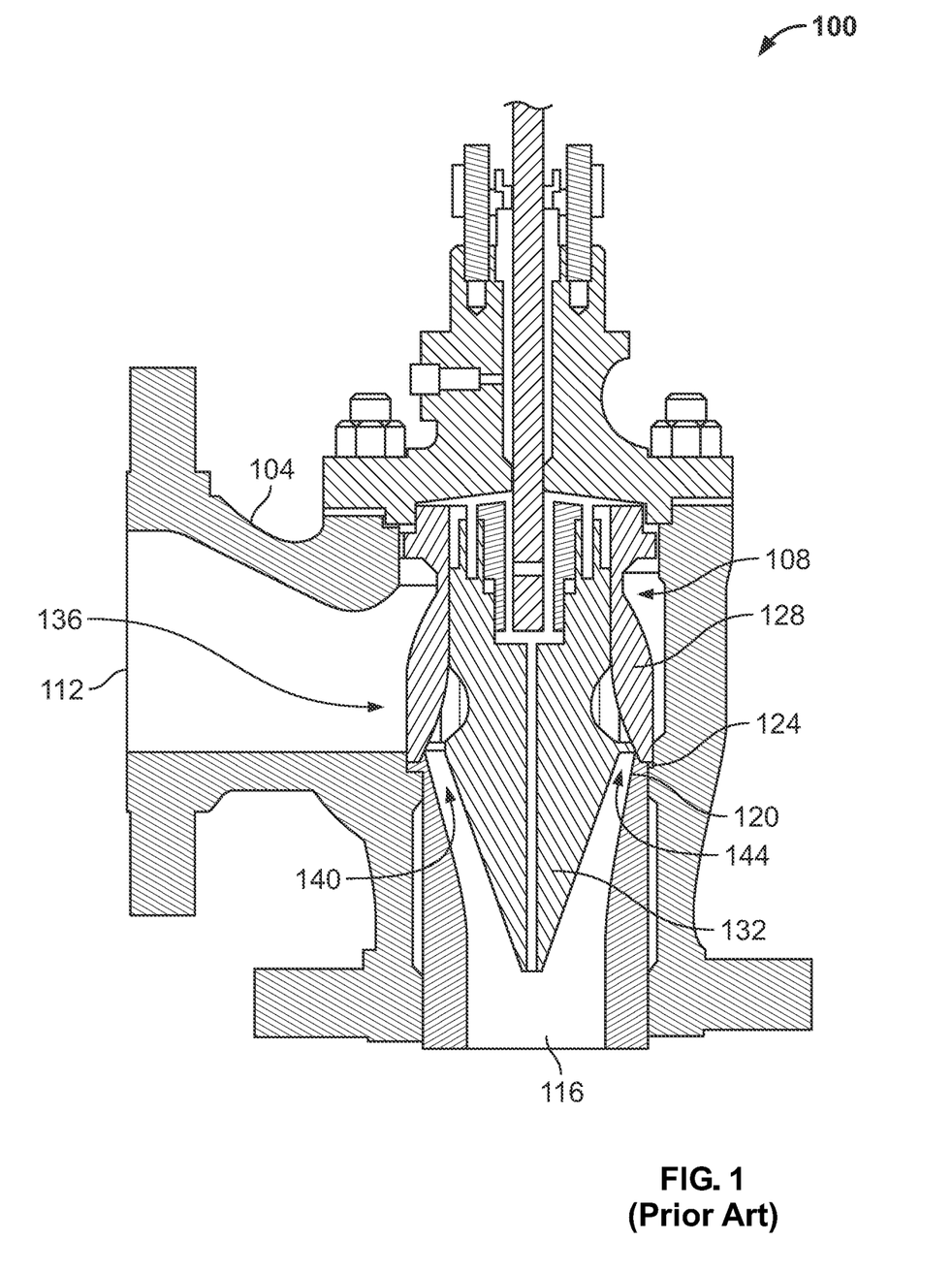
FIG. 1 is a cross-sectional view of a conventional control valve that is operable in a choked flow condition.

FIG. 1 illustrates one known example of a control valve 100 that is operable in a choked flow condition. As illustrated, the control valve 100 includes a valve body 104 and a trim assembly 108 arranged in the valve body 104. The valve body 104 defines an inlet 112 and an outlet 116 connected by an annular valve port 120. The trim assembly 108 includes a seat ring 124, a seat ring retainer 128, and a valve plug 132. The seat ring 124 is arranged in the valve port 120. The seat ring retainer 128 is seated against the seat ring 124 to retain the seat ring 124 in position within the valve port 120. The valve plug 132 movably interacts with the seat ring 124 to control fluid flow through the valve port 120 (and thus the control valve 100).

The known flow control valve 100 suffers from many problems, however. Because fluid flowing through the valve port 120 tends to take the path of least resistance (i.e., the easiest route), most of the fluid flowing through the valve port 120 tends to flow through the valve port 120 at or through a front portion 136 of the perimeter of the valve port 120 (closest to a front side 140 of the seat ring 124 and a front side of the valve plug), as opposed to the rear portion 144 of the valve port 120 (opposite the front portion 136). In other words, fluid is not evenly distributed to and around the perimeter of the valve port 120 and the valve plug 132 when flowing from the inlet 112 to the outlet 116 through the valve port 120. As a result of this uneven distribution, a swirling effect is created, whereby fluid flowing through the valve port 120 at the rear portion 144 of the valve port changes direction several times before actually entering and flowing through the valve port 120. This change in direction causes a reduction in flow velocity, which also reduces the pressure of the fluid relative to the pressure of the fluid flowing through the valve port 120 at the front portion 136, thereby inducing an unbalanced velocity profile and an unbalanced pressure profile across the known control valve 100.

SUMMARY

A valve trim assembly configured to be disposed in a fluid flow control valve, including, a valve seat adapted to be disposed in a fluid passageway of the fluid flow control valve. The valve seat includes an annular flange and a seating surface spaced from the annular flange. The valve trim assembly additionally includes a fluid control member movable relative to the valve seat to control fluid flow through the fluid passageway, wherein the fluid control member is movable from a closed position, in which the fluid control member sealingly engages the seating surface of the valve seat, and an open position, in which the fluid control member is spaced from the seating surface, by moving the fluid control member away from the annular flange of the valve seat.

A valve trim assembly configured to be disposed in a fluid flow control valve, including a valve seat adapted to be disposed in a fluid passageway of the fluid flow control valve. The valve seat includes a first seat portion converging from a first diameter to a second diameter smaller than the first diameter and a second seat portion diverging from the second diameter to a third diameter larger than the second diameter. The valve seat additionally includes a third seat portion converging from the third diameter to a fourth diameter smaller than the third diameter, and a fourth seat portion diverging from the fourth diameter to a fifth diameter larger than the fourth diameter. The valve trim assembly also includes a fluid control member movable relative to the valve seat to control fluid flow through the fluid passageway, wherein the fluid control member is movable from a closed position, in which the fluid control member sealingly engages the valve seat, and an open position, in which the fluid control member is spaced from the valve seat, and wherein the fluid control member has a distal end disposed between the second and fourth diameters when the fluid control member is in the closed position.

A fluid flow control valve including a valve seat adapted to be disposed in a fluid passageway of the fluid control valve and having a proximal end and a distal end opposite the proximal end, the proximal end being disposed in the valve body. The fluid control valve also includes a fluid control member, having a distal end at least partly disposed outside the valve body, having a sealing surface configured to selectively engage the valve seat to control fluid flow through the fluid passageway, wherein the fluid control member sealingly engages the valve seat in a closed position.

BRIEF DESCRIPTION OF THE DRAWINGS

The features of this disclosure which are believed to be novel are set forth with particularity in the appended claims. The present disclosure may be best understood by reference to the following description taken in conjunction with the accompanying drawings, in which like reference numerals identify like elements in the several figures, in which:

The figures depict preferred embodiments for the purposes of illustration only and are not to scale. One skilled in the art will readily recognize from the following discussion that alternative embodiments of the devices illustrated herein may be employed without departing from the principles of the invention described herein.

DETAILED DESCRIPTION

The present disclosure is directed to a high recovery fluid flow choke valve that provides improved choked flow performance and controlled volumetric flow rate therethrough. The high recovery fluid flow choke valve is a pushdown-to-open choke valve that is designed to provide a choke point lower than conventional fluid control valves such as the control valve 100 illustrated in FIG. 1. As a result, the fluid passing through the disclosed fluid flow choke valve is more evenly distributed through the restriction point. The more uniform fluid flow through the restriction point improves the choking performance of the fluid control valve and provides better volumetric fluid flow control. For example, the uniform fluid flow provides a lower overall pressure drop as compared to conventional control valves such as the control valve 100.

Figure 2:
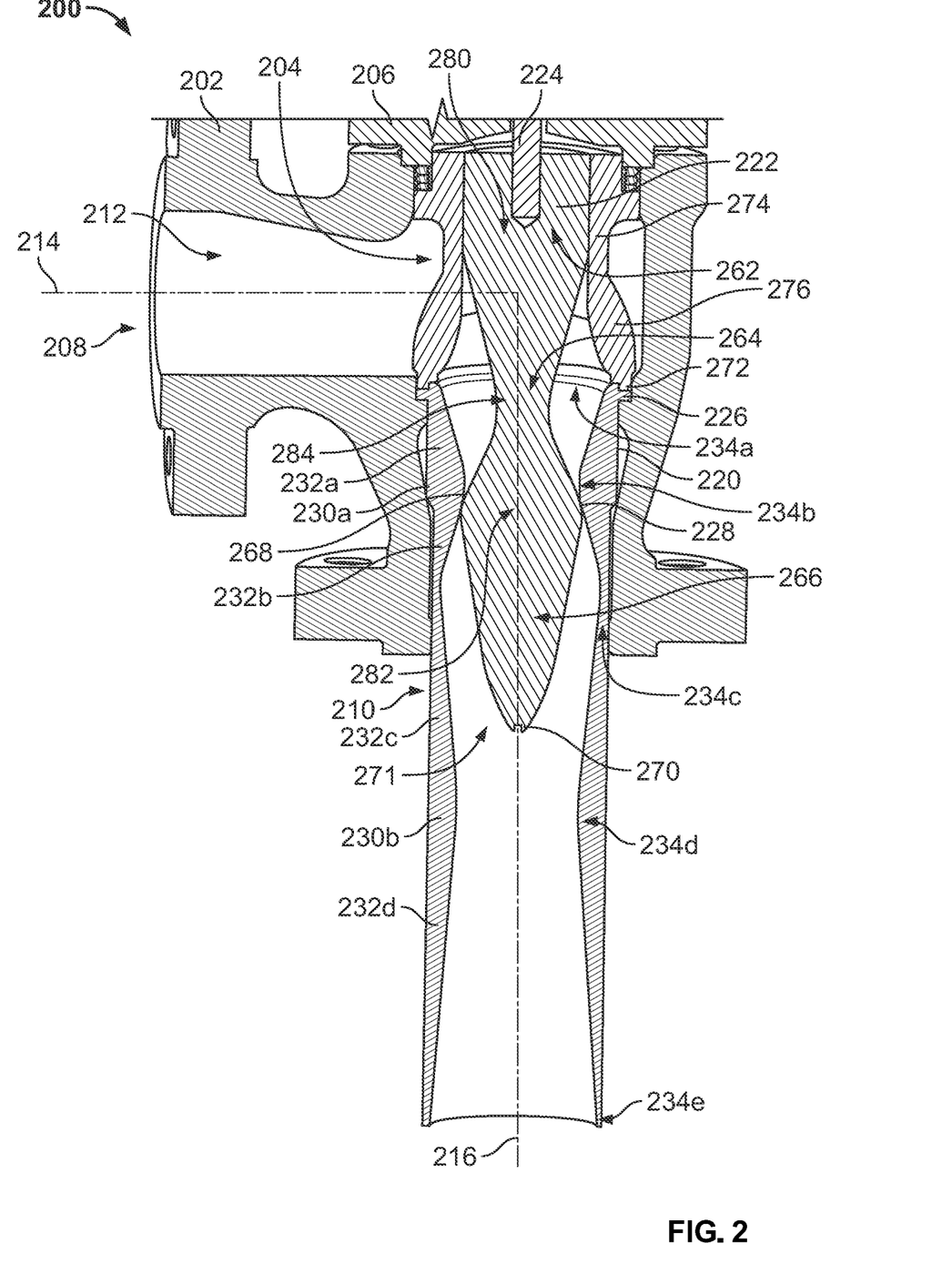
FIG. 2 is a cross-sectional view of a first example of a high recovery fluid flow choke valve constructed in accordance with the teachings of the present invention and in a closed position.

FIG. 2 is a cross-sectional view of a fluid flow control valve 200 constructed in accordance with the teachings of the present invention. The fluid flow control valve 200 is a push-down-to-open high recovery choke valve that generally includes a valve body 202, a valve trim assembly 204 coupled to the valve body 202, and a bonnet assembly 206 (only a small portion of which is illustrated in FIG. 2) coupled (e.g., fastened) to the valve body 202. While not illustrated, the bonnet assembly 206 can, as is known in the art, include valve packing, one or more packing rings, and one or more packing flanges.

The valve body 202 has an inlet 208, an outlet 210, and a fluid passageway 212 between the inlet 208 and the outlet 210. In this example, the inlet 208 and outlet 210 have a substantially annular cross section. As shown in FIG. 2, in this example, the inlet 208 is oriented along an inlet axis 214 and the outlet 210 is oriented along an outlet axis 216 that is perpendicular to the inlet axis 214, such that the outlet 210 is perpendicular to the inlet 208. In other examples, the outlet axis 216 can be parallel to or coaxial with the inlet axis 214, such that the outlet 210 is parallel to or co-axial with the inlet 208.

The valve trim assembly 204 generally includes a valve seat 220, a fluid flow control member 222, and a valve stem 224 that is coupled to the fluid flow control member 222 and passes through the bonnet assembly 206. In the illustrated example, the valve seat 220 is disposed in the fluid passageway 212 of the fluid flow control valve 200 and extends through the outlet 210 and out of the outlet 210 (and the valve body 202). The valve seat 220 includes an annular flange 226 and a seating surface 228 spaced from the annular flange 226. As shown in the example of FIG. 2, the annular flange 226 connects the valve seat 220 to the valve body 202. While not illustrated herein, one or more sealing elements may be disposed between the annular flange 226 and the valve body 202 in order to effect a seal between the valve seat 220 and the valve body 202.

As illustrated in FIG. 2, the valve seat 220 in this example includes a first convergent-divergent nozzle 230a upstream of the seating surface 228. The first convergent-divergent nozzle 230a is formed by a first seat portion 232a that converges from a first diameter 234a to a second diameter 234b smaller than the first diameter 234, and a second seat portion 232b that is adjacent to (and downstream of) the first seat portion 232a and diverges from the second diameter 234b to a third diameter 234c larger than the second diameter 234b. The second seat portion 232b also carries or defines the seating surface 228 between the second diameter 234b and the third diameter 234c. In addition to forming the first convergent-divergent nozzle 230a, the first seat portion 232a and the second seat portion 232b also generally form a Venturi tube. In this example, the second seat portion 232b has approximately the same length (measured in a direction along the outlet axis 216) as the first seat portion 232a. In other examples, however, the first seat portion 232a can be longer or shorter than the second seat portion 232b.

As also illustrated in FIG. 2, the valve seat 220 in this example further includes a second convergent-divergent nozzle 230b that is downstream of, and adjacent to, the first convergent-divergent nozzle 230a. The second convergent-divergent nozzle 230b is formed by a third seat portion 232c that converges from the third diameter 234c to a fourth diameter 234d smaller than the third diameter 234c. In this example, the fourth diameter 234d is larger than the second diameter 234b. The second convergent-divergent nozzle 230b is further formed by a fourth seat portion 232d that is adjacent the third seat portion 232c and diverges from the fourth diameter 234d to a fifth diameter 234e larger than the fourth diameter 234d. The third seat portion 232c and the fourth seat portion 232d also generally form a Venturi tube. As shown in FIG. 2, in this example the second convergent-divergent nozzle 230b is longer than the first convergent-divergent nozzle 230a (measured in a direction along the outlet axis). In other examples, the first convergent-divergent nozzle 230a can be longer than the second convergent-divergent nozzle or the two convergent-divergent nozzles can be the same length.

The fluid control member 222, which e.g., takes the form of a valve plug, is movable relative to the valve seat 220 and the valve body 202 to control fluid flow through the fluid passageway 212. The stem 224 is actuated by, for example, an actuator (not shown), to move the fluid control member 222 between a closed position (illustrated in FIG. 2), in which the fluid control member sealingly engages the seating surface 228 of the valve seat 220, and an open position (illustrated in FIG. 3), in which the fluid control member 222 is spaced from the seating surface 228. Importantly, movement of the fluid control member 222 from the closed position to the open position is accomplished by moving the fluid control member 222 away from the annular flange 226 of the valve seat 220 (and away from the inlet 208 and the bonnet assembly 206). Thus, when the fluid flow control valve 200 is in the orientation illustrated in FIG. 2, movement of the fluid control member 222 in this manner moves the fluid control member 222 "down" from the closed position to the open position (hence why the fluid flow control valve 200 is referred to herein as a push-down-to-open choke valve). Conversely, movement of the fluid control member 222 from the open position to the closed position is accomplished by moving the fluid control member 222 toward the annular flange 226 (and toward the inlet 208 and the bonnet assembly 206). Thus, when the fluid flow control valve 200 is in the orientation illustrated in FIG. 2, movement of the fluid control member 222 in this manner moves the fluid control member 222 "up" from the open position to the closed position.

The fluid control member 222 generally has a body portion 262, a tapered portion 264, a nose portion 266, and a sealing surface 268 defined between the tapered portion 264 and the nose portion 266. The body portion 262 has a generally cylindrical shape having a first diameter 280. Meanwhile, the tapered portion 264 converges from the body portion 262 before diverging back further towards the nose portion 266, such that the sealing surface 268 has a second diameter 282 that is larger than the first diameter 280 (of the body portion 262). The nose portion 266 in turn converges towards a tip 270 defined at a distal end 271 of the fluid control member 222.

In some examples, such as the example illustrated in FIG. 2, the valve trim assembly 204 further includes a seat ring retainer 272 that is seated against the valve seat 220 to retain the valve seat 220 in position within the valve body 202. In this example, the seat ring retainer 272 includes a valve skirt 274 and a plurality of legs 276 that extend downward from the valve skirt 274 and engage the annular flange 226 of the valve seat 220. In some examples, the legs 276 are designed to separate the annular flange 226 and the valve skirt 274 to create a large flow area in the fluid passageway 212. Additionally, the legs 276 can have an airfoil cross-section shape to minimize fluid drag and inhibit circumferential flow. The seat ring retainer 272 may include between three and twelve legs.

Figure 3:
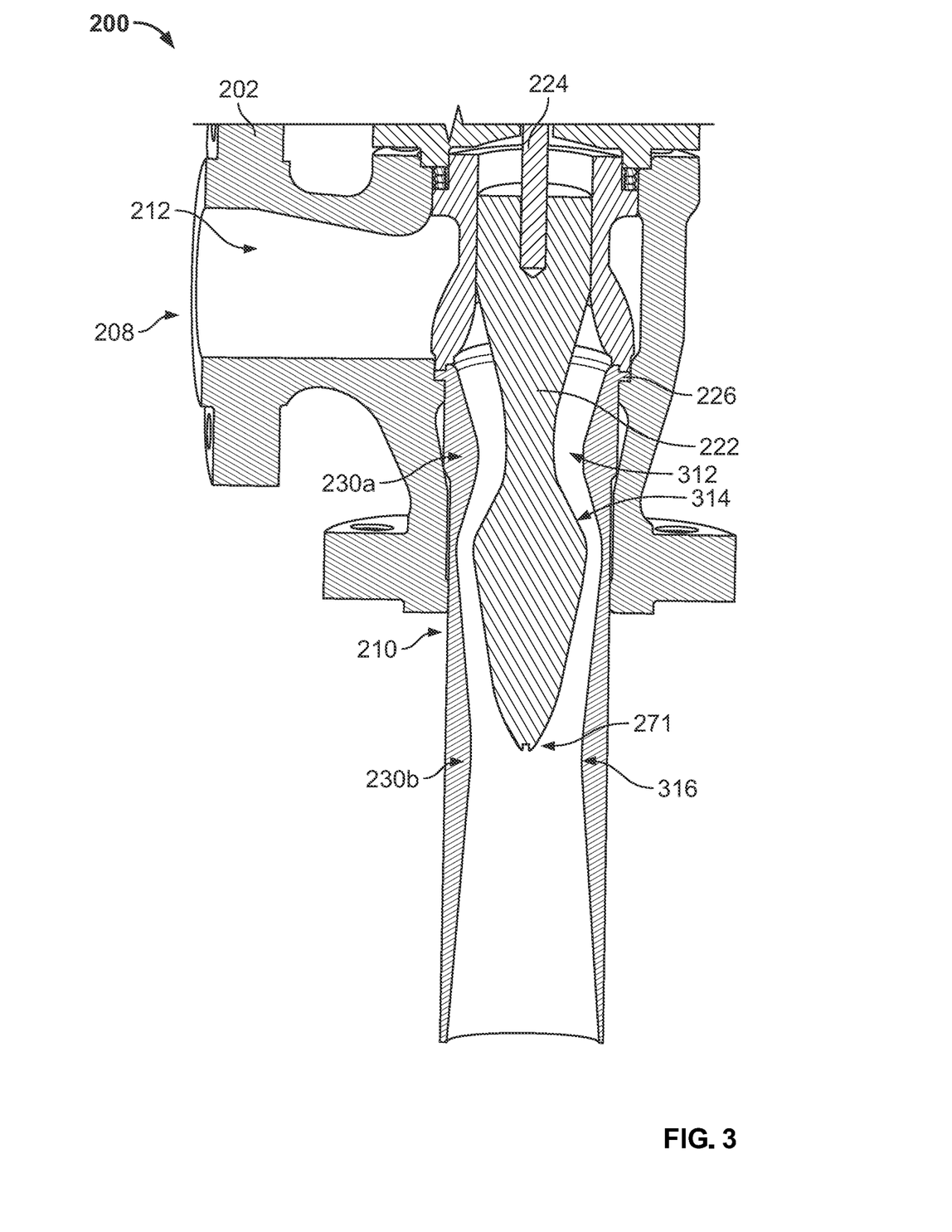
FIG. 3 is similar to FIG. 2, but shows the high recovery fluid flow choke valve in an open position.

As discussed above, in operation the fluid control member 222 is movable between the closed position shown in FIG. 2 and the open position shown in FIG. 3, which is downstream of the closed position. More particularly, the tapered portion 264, the nose portion 266, and the sealing surface 268 are movably disposed within the valve seat 220 as the fluid control member 222 moves between the closed position and the open position. When the fluid control member 222 is in the closed position, the sealing surface 268 sealingly engages the seating surface 228 of the valve seat 220, and the nose portion 266 is partially disposed within the second seat portion 232b of the first convergent-divergent nozzle 230a and partially disposed within the first seat portion 232c of the second convergent-divergent nozzle 230b. Moreover, the distal end 271 of the fluid control member 222 is disposed between the second diameter 234b of the valve seat 220 and the fourth diameter 234d when the fluid control member 222 is in the closed position. As such, the distal end 271 of the fluid control member 222 is at least partly disposed outside the valve body 202. Conversely, when the fluid control member 222 is in the open position, the sealing surface 268 is downstream of the seating surface 228 of the valve seat 220, and the nose portion 266 is substantially disposed within the first seat portion 232c of the second convergent-divergent nozzle 230b. Moreover, the distal end 271 is disposed outside the valve body 202. Additionally, it will be appreciated that the tapered portion 264 has a third diameter 284 that is smaller than the first diameter 280 and the second diameter 282. As such, the first diameter 280 and the third diameter 284 can pass through the second diameter 234b of the valve seat 220, but the second diameter 282 cannot.

As best illustrated in FIG. 3, the fluid control valve 200 also includes a plurality of fluid flow restrictions that serve to restrict fluid flow when the fluid control member 222 is in the open position. In this example, the fluid control valve 200 includes a first fluid flow restriction 312 defined by the second diameter 234b, and a second fluid flow restriction 314 disposed between the fluid control member 222 and the second seat portion 232b. Thus, in this example the second fluid flow restriction 314 has an annular cross-sectional area and provides a smaller cross sectional area than the first fluid flow restriction 312. Because the second fluid flow restriction 314 provides a smaller cross sectional area than the first fluid flow restriction 312, the second fluid flow restriction point 314 is a flow choke point. Additionally, the flow choke point 314 is further downstream than flow choke points are typically positioned in conventional fluid control valves such as the valve 100, such that fluid passing through the fluid passageway 212 is more uniformly distributed around the fluid control member 222. The more uniform flow improves the efficiency of the valve compared to conventional fluid control valves. In this example, the fluid control valve 200 also includes a third fluid flow restriction 316, which can be defined by the fourth diameter 234d or can be defined by the cross sectional area between the distal end 271 and the fourth diameter 234d.

When the fluid control member 222 is in the open position illustrated in FIG. 3, the valve trim assembly 204 provides a smooth and extended flow passage geometry that improves the performance of the fluid control valve 200. The smooth and extended flow passage geometry provides slow compression before the choking point, i.e., the second fluid flow restriction 314, and smooth expansion after the choking point. For example, the tapered portion 264 provides a smooth contraction and expansion of the fluid flow through the fluid control valve 200. Additionally, the choke point is lower in the valve seat 220 (as compared to, for example, the fluid control valve 100), which also improves the performance of the fluid control valve 200 over conventional valves like the fluid control valve 100. The smooth and extended flow passage can additionally be angled, as in this example by way of the third seat portion 232c, or can be curved to further control flow expansion. So configured, the fluid control valve 200 provides improved control and pressure loss performance over conventional valves such as the fluid control valve 100.

Figure 4:
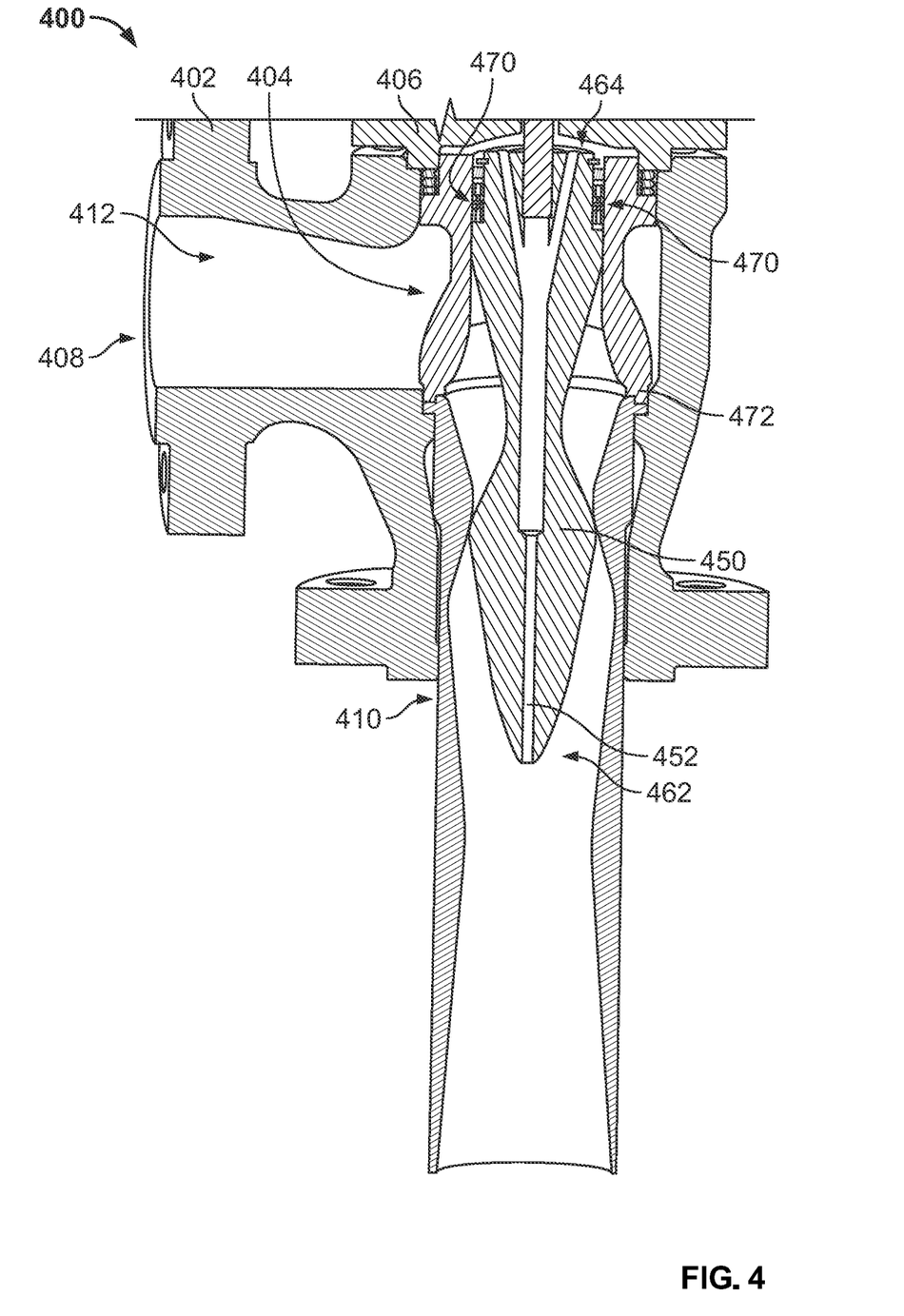
FIG. 4 is a cross-sectional view of a second example of a high recovery fluid flow choke valve constructed in accordance with the teaching of the present invention.

FIG. 4 illustrates an alternative example of a fluid flow control valve 400 constructed in accordance with the teachings of the present invention. The fluid flow control valve 400 of FIG. 4 is substantially similar to the fluid flow control valve 200 in that the fluid flow control valve 400 is a push-down-to-open high recovery choke valve and includes a valve body 402, a valve trim assembly 404 coupled to the valve body 402, and a bonnet assembly 406 (only a small portion of which is illustrated in FIG. 4). The valve body 402 and the bonnet assembly 406 are identical to the valve body 202 and the bonnet assembly 206, respectively.

However, unlike the valve trim assembly 204, the valve trim assembly 404 includes a balanced fluid control member 450 (e.g., a balanced plug). The balanced fluid control member 450 has a balancing hole 452 that provides fluid communication between a distal end 462 of the balanced fluid control member 450 and a proximal end 464 of the balanced fluid control member 450. As a result, the pressure downstream of the balanced fluid control member 450 acts on both the distal end 462 and the proximal end 464 of the balanced fluid control member 450. This, in turn, minimizes the pressure differential on the opposite ends of the fluid control member 450, such that the fluid control member 450 is not affected by forces of fluid flow. Additionally, the neutral fluid forces acting on the fluid control member 450 greatly reduce the forces (and thus the energy) required to actuate the balanced fluid control member 450. Further, because the fluid control member 450 includes the balancing hole 452, the balance fluid control member 450 additionally includes a sealing assembly 470 carried by an outer surface of the fluid control member 450. The sealing assembly 470 may, for example, include one or more seals (e.g., O-rings), one or more bushings, one or more bearings, other suitable elements, or combinations thereof. The sealing assembly 470 therefore inhibits fluid that has flown through the balancing hole 452 from flowing between the outer surface of the fluid control member 450 and the seat ring retainer 472 (which is identical to the seat ring retainer 272).

Figure 5:
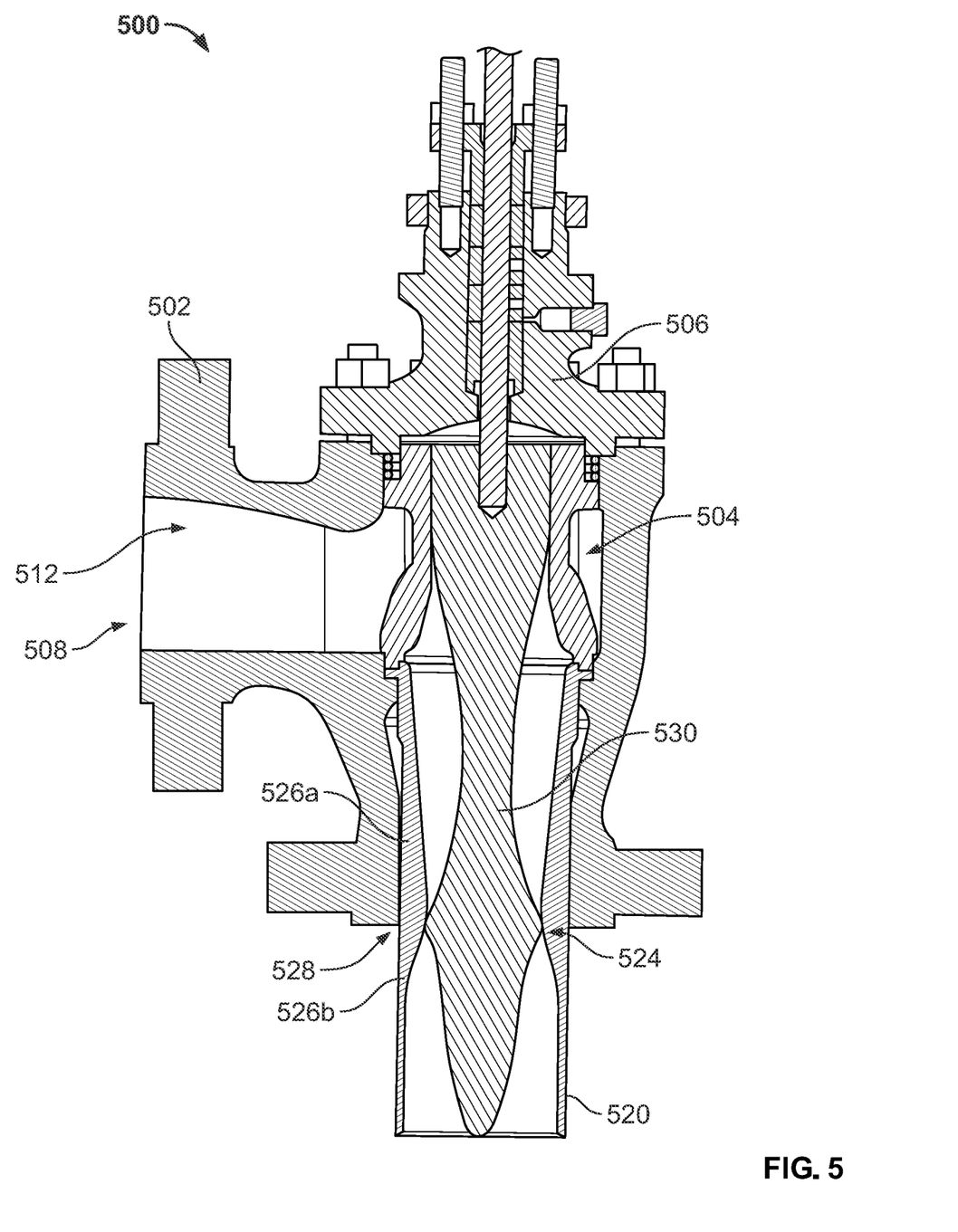
FIG. 5 is a cross-sectional view of a third example of a high recovery fluid flow choke valve constructed in accordance with the teaching of the present invention.

FIG. 5 illustrates another alternative fluid control valve 500 constructed in accordance with the teaching of the present invention. The fluid control valve 500 is substantially similar to the fluid flow control valve 200 in that the fluid flow control valve 500 is a push-down-to-open high recovery choke valve and includes a valve body 502, a valve trim assembly 504 coupled to the valve body 502, and a bonnet assembly 506 (only a portion of which is illustrated in FIG. 5). The valve body 502 and the bonnet assembly 506 are identical to the valve body 202 and the bonnet assembly 206, respectively.

However, the valve trim assembly 504 includes a valve seat 520 that is different from the valve seat 220. First, the valve seat 520 includes a seating surface 524 disposed lower in the valve seat 520 (i.e., further from the inlet 504) than the valve seat 220. The valve seat 520 and the lower seating surface 524 are alternative designs that offer different choke performances at different valve travels than the fluid control valve 200 or fluid control valve 400. Second, the valve seat 520 only includes a single convergent-divergent nozzle 528. As illustrated, the convergent-divergent nozzle 528 carries or defines the seating surface 524. The convergent-divergent nozzle 528 provides a longer, smoother flow geometry compared to the convergent-divergent nozzle 230a. As shown in FIG. 5, the convergent-divergent nozzle 528 has a converging portion 526a disposed adjacent a diverging portion 526b, and the converging portion 526a is longer than the diverging portion 526b. However, in other examples, the converging portion 526a can be the same length or shorter than the diverging portion 526b.

The fluid control valve 500 further includes a fluid control member 530. The fluid control valve 500 is actuatable between an open position and a closed position by moving the fluid control member 530 in a manner similar to the movement of fluid control member 222. As shown in FIG. 5, the fluid control valve 500 is disposed in a closed position, but the fluid control valve can be opened by actuating the fluid control member 530 away from the sealing surface 524, which in the illustrated orientation moves the fluid control member 530 "down" from the sealing surface 524. Similar to the fluid control valve 200, this provides a smooth flow contraction and expansion as the fluid passes through the fluid control valve 500 and the choke point.

The Applicant has verified the improved performance of the fluid control valves described herein. Table 1, below, shows the improved performance of the fluid control valve 200 at high percentage travel of the valve or fluid control valve 500 at low percentage travel of the valve (e.g., 10% and 90%). It has been observed that fluid control valve 500 has a better pressure differential for lower travel but fluid control valve 200 has the better pressure differential for higher travel.

TABLE 1

VALVE INLET ABSOLUTE PRESSURE/VALVE OUTLET ABSOLUTE PRESSURE CHANGE COMPARING FLUID CONTROL VALVE 100

| FLUID CONTROL VALVE 200 AT 90% TRAVEL | FLUID CONTROL VALVE 500 AT 10% TRAVEL |
|---|---|
| −0.02 | −0.04 |

Finally, while the flow control valves 200, 400, and 500 described herein are operable to choke fluid flow, it will be appreciated that the principles of the present disclosure can be applied to fluid flow control valves that do not choke fluid flow.

What is claimed:

1. A valve trim assembly configured to be disposed in a fluid flow control valve, comprising: a valve seat adapted to be disposed in a fluid passageway of the fluid flow control valve and having a proximal end and a distal end opposite the proximal end, the proximal end adapted to be disposed in the fluid passageway, and the valve seat comprising an annular flange and a seating surface spaced from the annular flange, the annular flange disposed between the proximal end and the seating surface; and a fluid control member movable relative to the valve seat to control fluid flow through the fluid passageway, wherein the fluid control member is movable from a closed position, in which the fluid control member includes a sealing surface that sealingly engages the seating surface of the valve seat, to an open position, in which the fluid control member is spaced from the seating surface, by initial movement of the sealing surface away from the annular flange of the valve seat.

2. The valve trim assembly of claim 1, wherein the fluid control member includes a first diameter and a second diameter larger than the first diameter,
wherein the valve seat includes a first convergent-divergent nozzle, and
wherein the second diameter of the fluid control member is movably disposed within a divergent portion of the convergent-divergent nozzle.

3. The valve trim assembly of claim 2, wherein the valve seat further includes a second convergent-divergent nozzle disposed adjacent and downstream of the first convergent-divergent nozzle.

4. The valve trim assembly of claim 3, wherein the second convergent-divergent nozzle is longer than the first convergent-divergent nozzle.

5. The valve trim assembly of claim 2, wherein the fluid control member further comprises a third diameter, smaller than the first diameter, disposed between the first diameter and the second diameter.

6. The fluid control valve of claim 1, wherein the fluid control member is movable from the closed position to the open position by moving the fluid control member away from an inlet of the valve seat.

7. The valve trim assembly of claim 1, further comprising a seat ring retainer seated against the annular flange to retain the valve seat within the fluid passageway.

8. A valve trim assembly configured to be disposed in a fluid flow control valve, comprising:
a valve seat adapted to be disposed in a fluid passageway of the fluid flow control valve, the valve seat comprising:
a first seat portion converging from a first diameter to a second diameter smaller than the first diameter;

a second seat portion diverging from the second diameter to a third diameter larger than the second diameter;

a third seat portion converging from the third diameter to a fourth diameter smaller than the third diameter; and a fourth seat portion diverging from the fourth diameter to a fifth diameter larger than the fourth diameter; and a fluid control member movable relative to the valve seat to control fluid flow through the fluid passageway, wherein the fluid control member is movable between a closed position, in which the fluid control member sealingly engages the valve seat, and an open position, in which the fluid control member is spaced from the valve seat, and wherein the fluid control member has a distal end disposed between the second and fourth diameters when the fluid control member is in the closed position.

9. The valve trim assembly of claim 8, further comprising:
a first fluid flow restriction defined by the second diameter; and
a second fluid flow restriction disposed between the fluid control member and the second seat portion,
wherein when the fluid control member is in the open position, the second fluid flow restriction provides a smaller cross sectional area than the first fluid flow restriction.

10. The valve trim assembly of claim 9, further including a third fluid flow restriction defined by the fourth diameter.

11. The valve trim assembly of claim 8, wherein the valve seat comprises an annular flange and a seating surface spaced from the annular flange, and wherein the fluid control member is movable from the closed position to the open position by moving the fluid control member away from the annular flange of the valve seat.

12. The valve trim assembly of claim 8, wherein the open position is downstream of the closed position.

13. A fluid flow control valve, comprising:
a valve body defining an inlet, an outlet, and a fluid passageway between the inlet and the outlet; and
a valve trim assembly coupled to the valve body, comprising:
a valve seat disposed in the fluid passageway and having a proximal end, a distal end opposite the proximal end, and a seating surface disposed between the proximal end and the distal end, the proximal end and the seating surface being disposed in the valve body, and the distal end being disposed outside the valve body; and
a fluid control member having a distal end and a sealing surface configured to selectively engage the valve seat to control fluid flow through the fluid passageway, wherein the fluid control member is positionable in a closed position, in which the sealing surface sealingly engages the valve seat, and an open position, in which the fluid control member is downstream of the closed position, and
wherein when the fluid control member is in the open position, the distal end of the fluid control member is at least partly disposed outside the valve body.

14. The fluid control valve of claim 13, wherein the valve seat comprises an annular flange and the seating surface is spaced from the annular flange, and wherein the fluid control member is movable from the closed position to an open position, in which the sealing surface is spaced from the valve seat, by moving the fluid control member away from the annular flange of the valve seat.

15. The fluid flow control valve of claim 13, further comprising a fluid flow restriction point disposed between the proximal end of the valve seat and the sealing surface of the fluid control member.

16. The fluid control valve of claim 15, wherein the fluid flow restriction point is an annular cross-sectional flow area disposed between a seating surface of the valve seat and the sealing surface.

17. The fluid control valve of claim 16, wherein the fluid flow restriction point is a flow choke point.

18. The fluid control valve of claim 13, wherein the valve seat includes a first convergent-divergent nozzle.

19. The fluid control valve of claim 18, wherein the valve seat further comprises a second convergent-divergent nozzle downstream of the first convergent-divergent nozzle.

20. The fluid control valve of claim 18, wherein the fluid control member includes a first diameter and a second diameter larger than the first diameter, and
wherein the second diameter of the fluid control member is movably disposed within a divergent portion of the first convergent-divergent nozzle.

21. The fluid control valve of claim 20, wherein the fluid control member further comprises a third diameter disposed between the first diameter and the second diameter.

* * * * *

UNITED STATES PATENT AND TRADEMARK OFFICE
CERTIFICATE OF CORRECTION

PATENT NO. : 11,624,442 B2
APPLICATION NO. : 17/176053
DATED : April 11, 2023
INVENTOR(S) : Yan Qiu et al.

Page 1 of 1

It is certified that error appears in the above-identified patent and that said Letters Patent is hereby corrected as shown below:

In the Claims

Column 8, Line 54, Claim 6, "fluid control valve of claim" should be -- valve trim assembly of claim --.

Column 10, Line 15, Claim 13, "fluid control valve" should be -- fluid flow control valve --.

Column 10, Line 26, Claim 15, "fluid control valve" should be -- fluid flow control valve --.

Column 10, Line 30, Claim 17, "fluid control valve" should be -- fluid flow control valve --.

Column 10, Line 32, Claim 18, "fluid control valve" should be -- fluid flow control valve --.

Column 10, Line 34, Claim 19, "fluid control valve" should be -- fluid flow control valve --.

Column 10, Line 37, Claim 20, "fluid control valve" should be -- fluid flow control valve --.

Column 10, Line 43, Claim 21, "fluid control valve" should be -- fluid flow control valve --.

Signed and Sealed this
Twenty-seventh Day of August, 2024

Katherine Kelly Vidal
*Director of the United States Patent and Trademark Office*